No. 812,067. PATENTED FEB. 6, 1906.
DE HAVEN MORRIS.
TOOL.
APPLICATION FILED MAY 31, 1904.
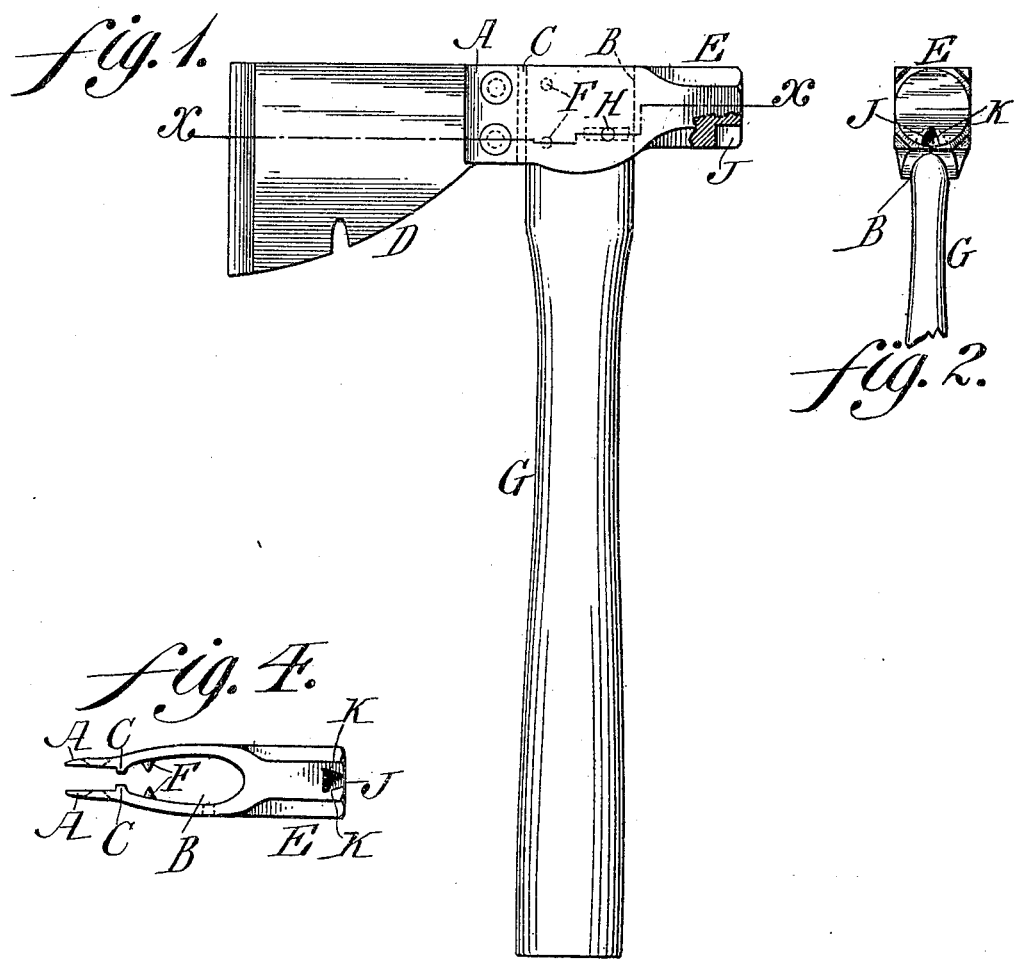
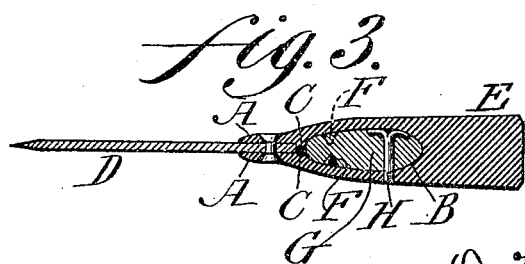

UNITED STATES PATENT OFFICE.

DE HAVEN MORRIS, OF WILMINGTON, DELAWARE.

TOOL.

No. 812,067.　　　Specification of Letters Patent.　　　Patented Feb. 6, 1906.

Application filed May 31, 1904. Serial No. 210,369.

*To all whom it may concern:*

Be it known that I, DE HAVEN MORRIS, a citizen of the United States, residing at Wilmington, in the county of Newcastle, State of Delaware, have invented a new and useful Improvement in Tools, of which the following is a specification.

My invention consists of an improvement in a tool, more particularly a hatchet, wherein the proper portions of the head may have a blade firmly connected therewith. The eye is adapted to have a handle most securely retained therein and a solid poll is presented, the latter having a nail-extracting member thereon when so required.

Figure 1 represents a side elevation of a hatchet embodying my invention. Fig. 2 represents an end view thereof. Fig. 3 represents a horizontal section on line $x\,x$, Fig. 1. Fig. 4 represents a top or plan view showing certain members in primary condition.

Similar letters of reference indicate corresponding parts in the figures.

Referring to the drawings, A designates a portion of the head of a hatchet, the same being of the form of arms which extend from the walls of the eye B of the hatchet, the outer ends of said walls of said eye being separated from each other. On the inner sides of the arms A adjacent to said walls are the shoulders C, against which the inner end of the blade D abuts as a stop for said blade, it being noticed that the adjacent portion of the blade is clamped between the arms A and riveted or otherwise firmly secured together. The rivets employed in the present case pass through said arms A forward of the shoulders C.

E designates the poll of a hatchet, the same being integral with the walls of the eye B and with the arms A, said parts being formed solid of cast steel, it being noticed that the arms A and forward portion of the walls of the eye B are primarily separated, as shown in Fig. 4, and said walls and arms are resilient, whereby they may be moved toward each other for purposes hereinafter described. On the inner faces are spurs F, which project toward each other and are adapted to enter the contiguous portion of the handle G of the hatchet.

H designates a pin the inner end of which is split, said pin being passed through an opening in one wall of the eye B and driven through the relative portion of the handle G and striking the imperforate portion of the inner side of the opposite wall of said eye has its split end or bifurcation spread apart, and, entering said handle G, clenches the handle and assists, with the spurs F, which penetrate said handle, to cause said handle and the head of the hatchet to be connected in a firm and durable manner. It will be seen that while the end of the pin effectively engages the adjacent side of the handle, thus providing additional means of holding the head on the handle, said end in its clenched condition is concealed by the adjacent side wall of the eye.

When the parts are in the position shown in Fig. 4, the handle is introduced into the eye B. Then the arms A and walls of the eye B are closed toward each other, thus compressing and clamping the portion of the handle within the eye and causing the spurs F to penetrate said portion. The proper portion of the blade D is tightly embraced by the arms A and rivets or other fastenings passed through said arms and blade, whereby the latter is most firmly connected with the hatchet-head. Then the pin H is inserted and clenched, thus additionally securing handle and head to each other and preventing the latter from flying off.

On the under side of the outer end of the poll E is the recess J, the walls K of which are of tapering form, said recess being adapted to receive the head of a nail, the sides of of which head are engaged by the tapering walls K of said recess, thus forming a claw or device for readily starting or extracting nails, &c., of various sizes from a floor, walls, &c., the head of the hatchet forming the leverage for said operation.

Various changes may be made in the details of construction shown without departing from the general spirit of my invention, and I do not, therefore, desire to be limited in each case to the same.

Having thus described my invention, what I claim as new, and desire to secure by Letters Patent, is—

1. In a tool of the character stated, a head, a handle-receiving eye, the blade-end walls of which are divided, independent arms extending outwardly from said walls, said walls and arms being primarily spread apart and of resilient nature a handle, a blade within said arms and secured thereto, a spur on an inner side wall of said eye adapted to engage said handle and an additional fastening device for said handle consisting of a pin passing through a side wall of said eye and through said handle and clenched on the latter.

2. In a tool of the character stated, a head, an eye therein, a handle in said eye, an opening in a side wall of said eye, and a pin passing through said opening and through said handle and having its inner end deflected on an opposite imperforate portion of said eye and clenched on said handle.

3. A tool of the character stated consisting of a head, an eye therein, a handle in said eye, an opening in a side wall of said eye, the portion of the other wall opposite to said opening being imperforate and a pin passing through said opening and handle and having its inner end deflected on the imperforate portion and clenched on said handle.

DE HAVEN MORRIS.

Witnesses:
SAML. C. BOND,
THOS. J. WIER, Jr.